(12) United States Patent
Wang

(10) Patent No.: US 12,060,922 B1
(45) Date of Patent: Aug. 13, 2024

(54) HIGH-STRENGTH CHAIN PLATE STRUCTURE

(71) Applicant: Wen-Pin Wang, Tainan (TW)

(72) Inventor: Wen-Pin Wang, Tainan (TW)

( * ) Notice: Subject to any disclaimer, the term of this patent is extended or adjusted under 35 U.S.C. 154(b) by 0 days.

(21) Appl. No.: 18/194,184

(22) Filed: Mar. 31, 2023

(30) Foreign Application Priority Data

Mar. 20, 2023 (TW) ................................. 112110267

(51) Int. Cl.
*F16G 13/06* (2006.01)
*B62M 9/00* (2006.01)

(52) U.S. Cl.
CPC ............... *F16G 13/06* (2013.01); *B62M 9/00* (2013.01); *B62M 2009/005* (2013.01)

(58) Field of Classification Search
CPC .... F16G 13/06; B62M 9/00; B62M 2009/005
USPC .......................................................... 474/230
See application file for complete search history.

(56) References Cited

U.S. PATENT DOCUMENTS

| | | | | |
|---|---|---|---|---|
| 8,734,280 B2 * | 5/2014 | Oishi | ...................... | F16G 13/06 474/230 |
| 2018/0313432 A1 * | 11/2018 | Ribeiro | ................... | F16G 13/06 |
| 2019/0346020 A1 * | 11/2019 | Dos Santos | .............. | B62M 9/00 |
| 2021/0102603 A1 * | 4/2021 | Braedt | ...................... | B62M 9/12 |
| 2021/0207684 A1 * | 7/2021 | Wu | .......................... | F16G 13/06 |
| 2021/0381581 A1 * | 12/2021 | Tavares Miranda | .... | F16G 13/06 |
| 2022/0042575 A1 * | 2/2022 | Wu | .......................... | F16G 13/06 |
| 2022/0196115 A1 * | 6/2022 | Saito | ....................... | F16G 13/06 |

FOREIGN PATENT DOCUMENTS

| | | |
|---|---|---|
| CN | 203453391 U | 2/2014 |
| DE | 10347784 A1 | 5/2005 |
| DE | 102017009632 A1 | 5/2018 |
| DE | 102022123435 A1 | 3/2023 |
| TW | I636205 B | 9/2018 |
| TW | 201918649 A | 5/2019 |
| TW | M592928 U | 4/2020 |
| TW | I767040 B | 6/2022 |

\* cited by examiner

*Primary Examiner* — Gene O Crawford
*Assistant Examiner* — Emily R Kincaid
(74) *Attorney, Agent, or Firm* — Rosenberg, Klein & Lee

(57) ABSTRACT

A high-strength chain plate structure comprises an inner plate body and an outer plate body. The inner plate body has a first waist portion provided with a first receiving portion and a first outer side portion. The first outer side portion has a first slope. The first slope and the first waist portion form a continuous two-step structure. The outer plate body has a second waist portion provided with a second receiving portion and a second outer side portion. The second outer side portion has a second slope. The second slope and the second waist portion form a continuous two-step structure. The tensile strength, impact resistance and torsion resistance of the chain can be improved.

10 Claims, 14 Drawing Sheets

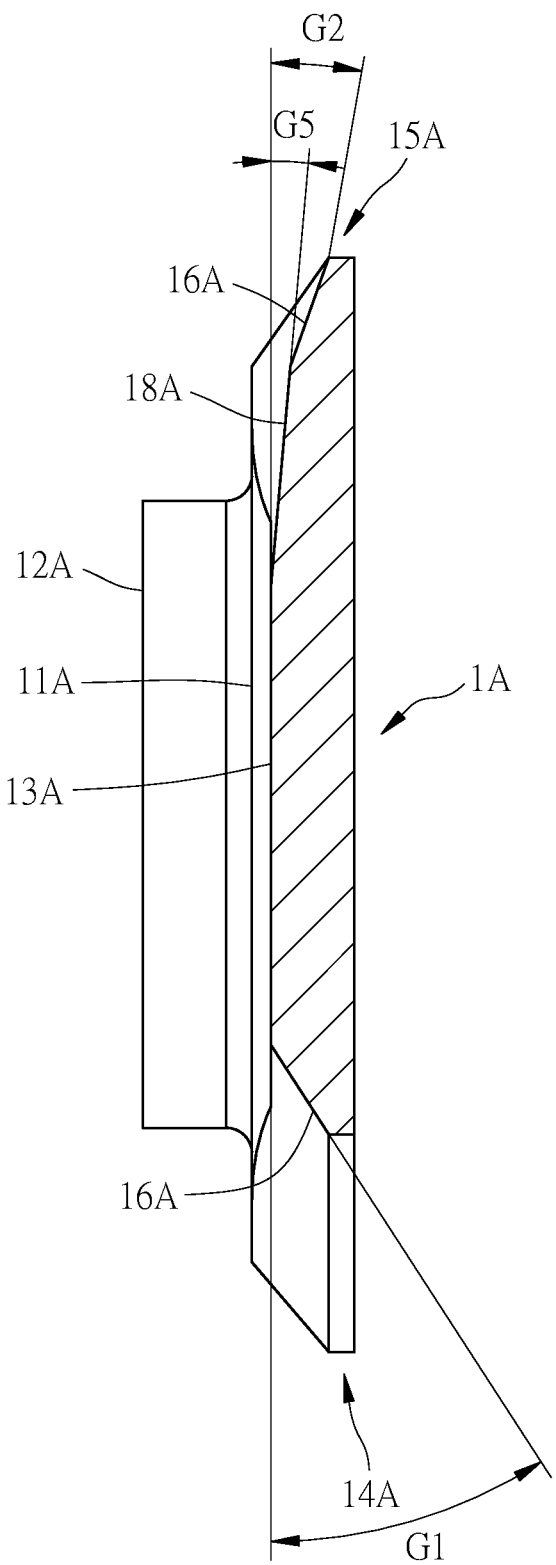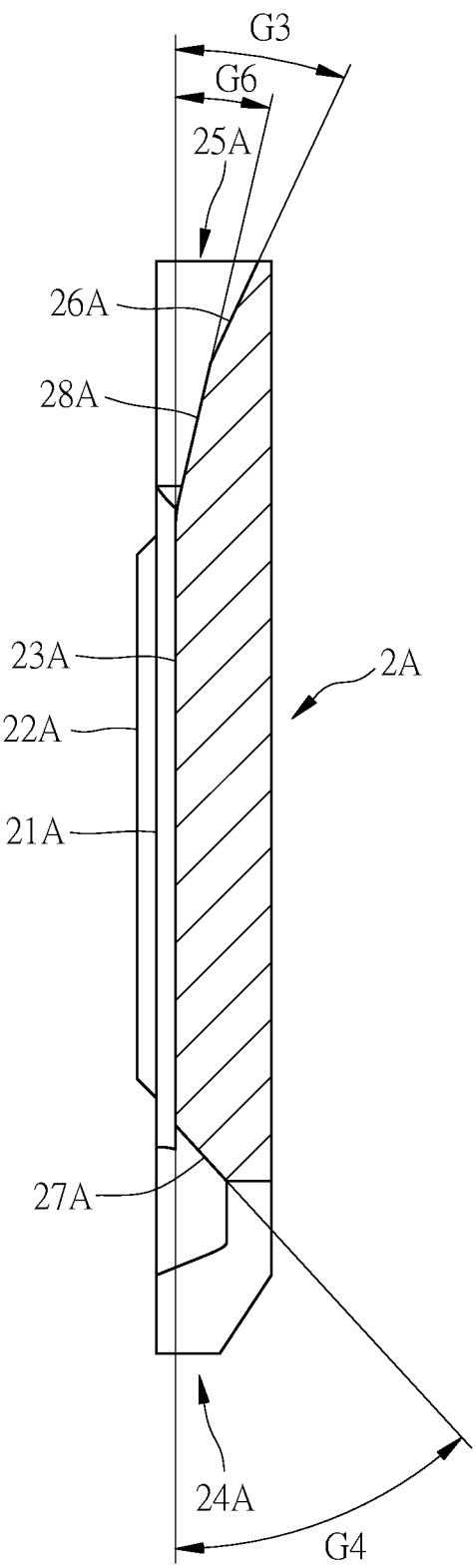
F I G . 11   F I G . 12

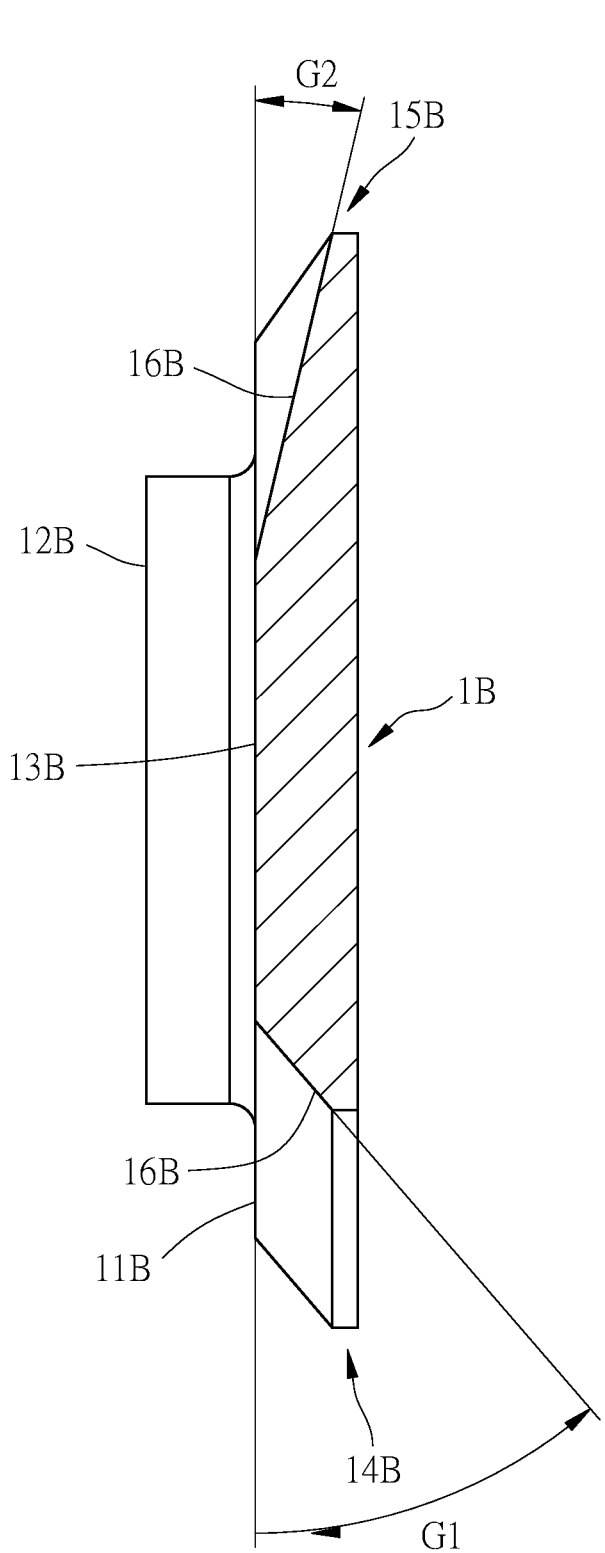 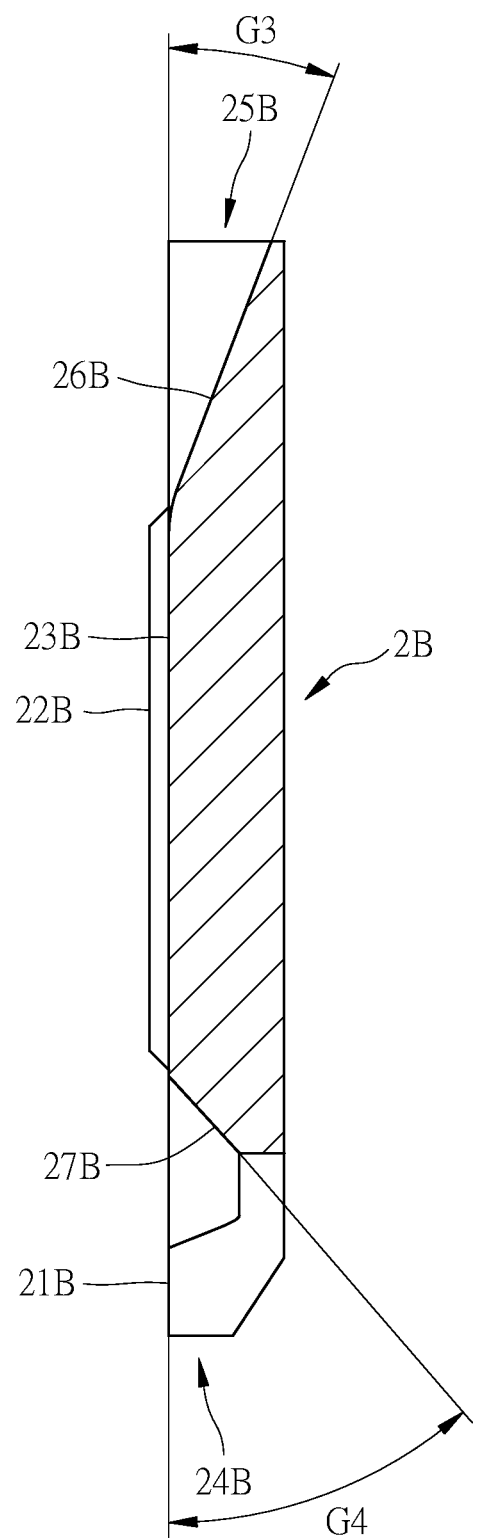
F I G. 16    F I G. 17

HIGH-STRENGTH CHAIN PLATE STRUCTURE

FIELD OF THE INVENTION

The present invention relates to a high-strength chain plate structure comprising an inner plate body and an outer plate body, which can improve the tensile strength, impact resistance and torsion resistance of the chain.

BACKGROUND OF THE INVENTION

In general, the speed change mechanism of an electric bicycle or mountaineering bicycle, in order to cooperate with the 12-stage speed change of the multi-stage rear flywheel, the total width of the chain is limited to about 5.2 mm, the spacing between the two outer plates of each link of the chain is limited to about 3.9 mm, and the spacing between the two inner plates of each link is limited to about 2.3 mm. The speed change mechanism uses the derailleur to move the chain up and down for switching a large gear or a small gear. When the chain is to be disengaged from or engaged with the large/small gear, it will cause obstructions between the chain plates of the chain and the sprockets of the large/small gear to affect the smooth operation during speed change.

As disclosed in Taiwan Patent Publication No. 1636205, titled "outer chain link and chain plate structure" and published on Sep. 21, 2018, the chain plate has a groove due to the aforementioned size limitations, which will cause insufficient strength of the chain plate. It is easy to cause deformation or breakage after use.

As disclosed in Taiwan Patent Publication No. 1767040 titled "bicycle chain and outer chain plate thereof" and published on Jun. 11, 2022, the middle portion of the first outer chain plate on one side is a concave curved surface, and the middle portion of the second outer chain plate on the other side is a straight surface. The straight surface is configured to increase the strength of the chain plate. However, such a structure also causes obstacles when the chain plates of the chain are to be engaged with the flywheel of the large/small gear to affect the smoothness of the speed change. Therefore, it is still not ideal in use.

SUMMARY OF THE INVENTION

In view of the shortcomings of the prior art, the primary object of the present invention is to a high-strength chain plate structure, comprising an inner plate body and an outer plate body. The inner plate body includes two first coupling portions at two ends thereof and a first waist portion between the two first coupling portions. The first coupling portion has a first axial hole passing through the first coupling portion. Two sides of the first waist portion are oppositely provided with a first receiving portion and a first outer side portion. The first receiving portion is curved. The first outer side portion is straight. The first outer side portion has a first slope. The first slope surrounds a perimeter of the inner plate body. The first slope and the first waist portion form a continuous two-step structure. The outer plate body includes two second coupling portions at two ends thereof and a second waist portion between the two second coupling portions. The second coupling portion has a second axial hole passing through the second coupling portion. Two sides of the second waist portion are oppositely provided with a second receiving portion and a second outer side portion. The second receiving portion is curved. The second outer side portion is straight. The second outer side portion has a second slope. The second slope and the second waist portion form continuous two-step structure.

According to the foregoing technical features, the present invention has the following advantages:

1. With the continuous two-step structure formed by the first slope and the first waist portion as well as the continuous two-step structure formed by the second slope and the second waist portion, the total width of the chain can be kept constant or reduced. The tensile strength, impact resistance and torsion resistance of the chain can be improved to enhance the safety of the chain, without changing the spacing between the two inner plate bodies and the spacing between the two outer plate bodies.

2. Because the first waist portion and the second waist portion are in the form of a recess, the strength and impact resistance may be reduced. With the first and second outer side portions that are located on the outer sides of the inner and outer plate bodies and are straight, in cooperation with the first and second slopes, the areas of the first and second waist portions increase, so as to increase the strength and impact resistance.

3. Because the first waist portion and the second waist portion of the inner plate body and the outer plate body are in the form of a recess, without changing the total width of the chain, the spacing between the two inner plate bodies and the spacing between the two outer plate bodies increase, so that they all meet the chain standard.

4. The curved first and second receiving portions and the straight first and second outer side portions of the first and second waist portions are configured to increase the strength, impact resistance and torsion resistance of the chain.

5. The first slope surrounds the entire perimeter of the inner plate body, and the second receiving portion has a chamfer. The chain cooperates with the guide wheel of the speed change mechanism to change speed, so that when the sprocket is engaged with or disengaged from the chain, the chain can be positioned quickly and run without making any noise.

BRIEF DESCRIPTION OF THE DRAWINGS

FIG. 11 is a cross-sectional view taken along line XI-XI of FIG. 9;

FIG. 12 is a cross-sectional view taken along line XII-XII of FIG. 10;

FIG. 16 is a cross-sectional view taken along line XVI-XVI of FIG. 14;

FIG. 17 is a cross-sectional view taken along line XVII-XVII of FIG. 15;

DETAILED DESCRIPTION OF THE PREFERRED EMBODIMENTS

Embodiments of the present invention will now be described, by way of example only, with reference to the accompanying drawings.

Figure 1:
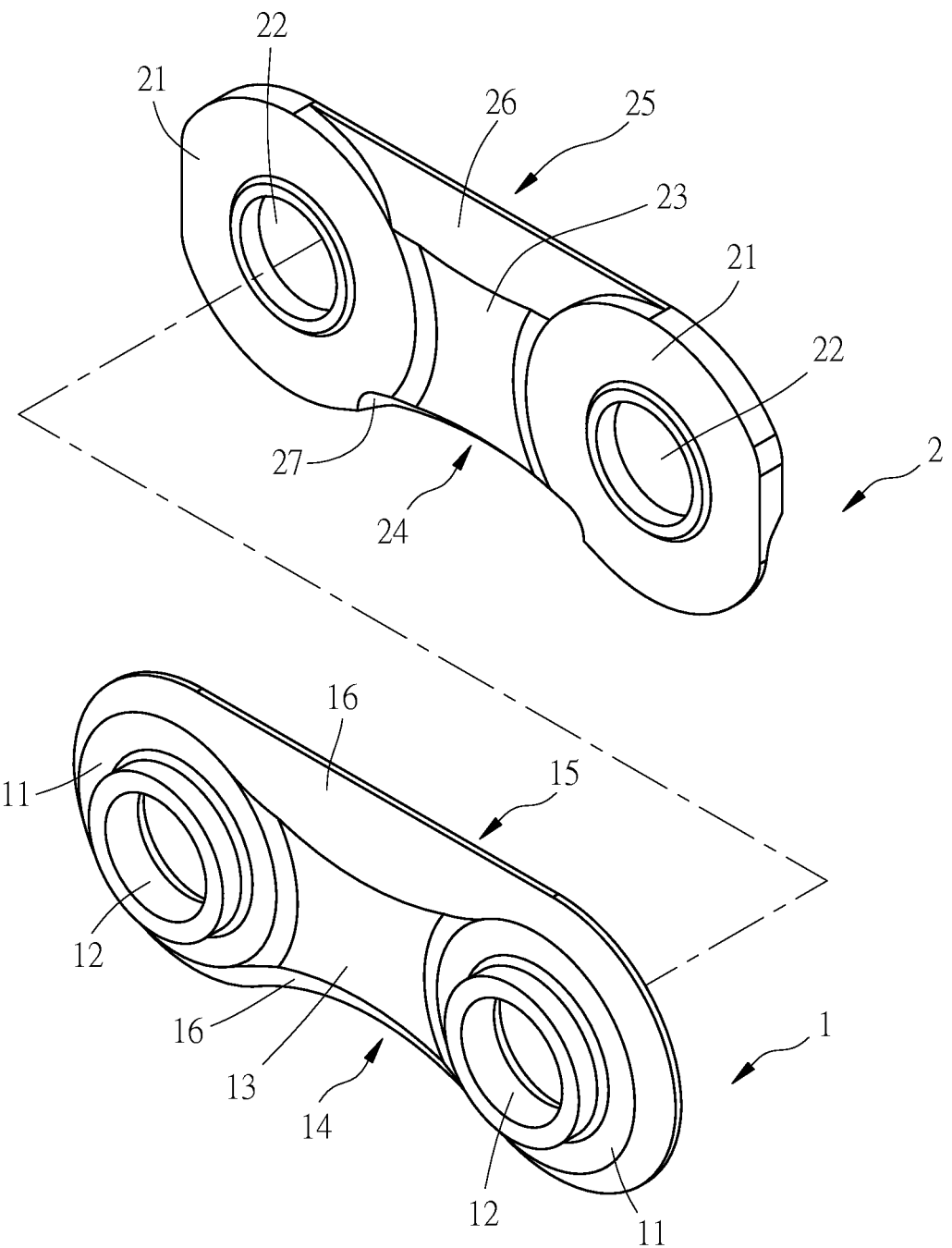
FIG. 1 is a perspective view according to a first embodiment of the present invention.
Figure 2:
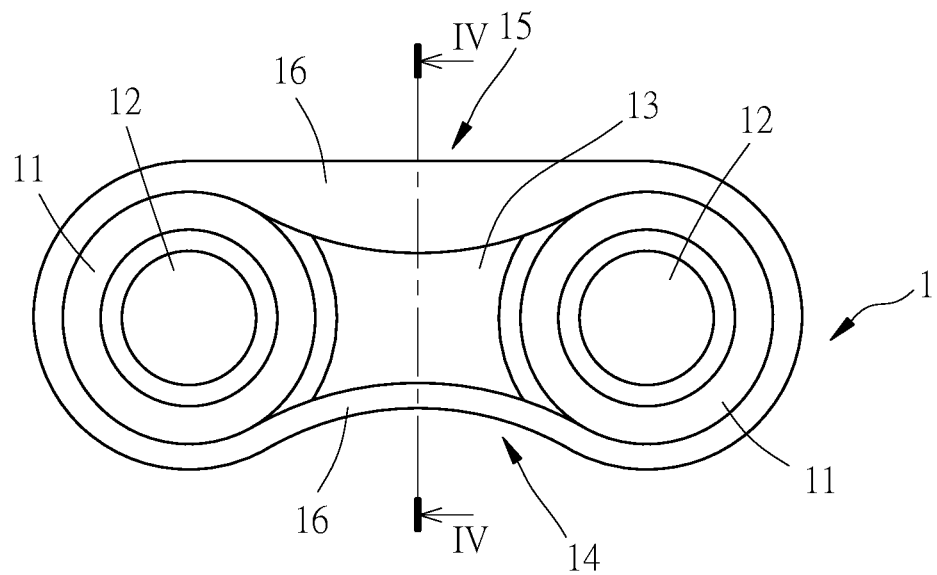
FIG. 2 is a front view of the inner plate body according to the first embodiment of the present invention.
Figure 3:
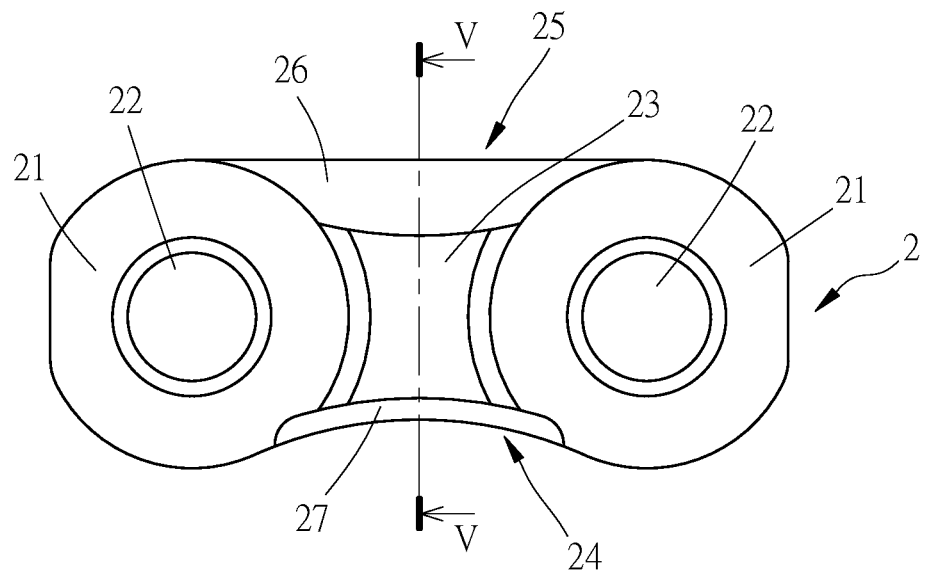
FIG. 3 is a front view of the outer plate body according to the first embodiment of the present invention.

As shown in FIG. 1, FIG. 2 and FIG. 3, the first embodiment of the present invention comprises an inner plate body 1 and an outer plate body 2. The inner plate body 1 and the outer plate body 2 each have two sides. One side where the inner plate body 1 and the outer plate body 2 engage with a sprocket of a flywheel is defined as an inner side, and the other side that does not engage with the sprocket is defined as an outer side.

Figure 4:
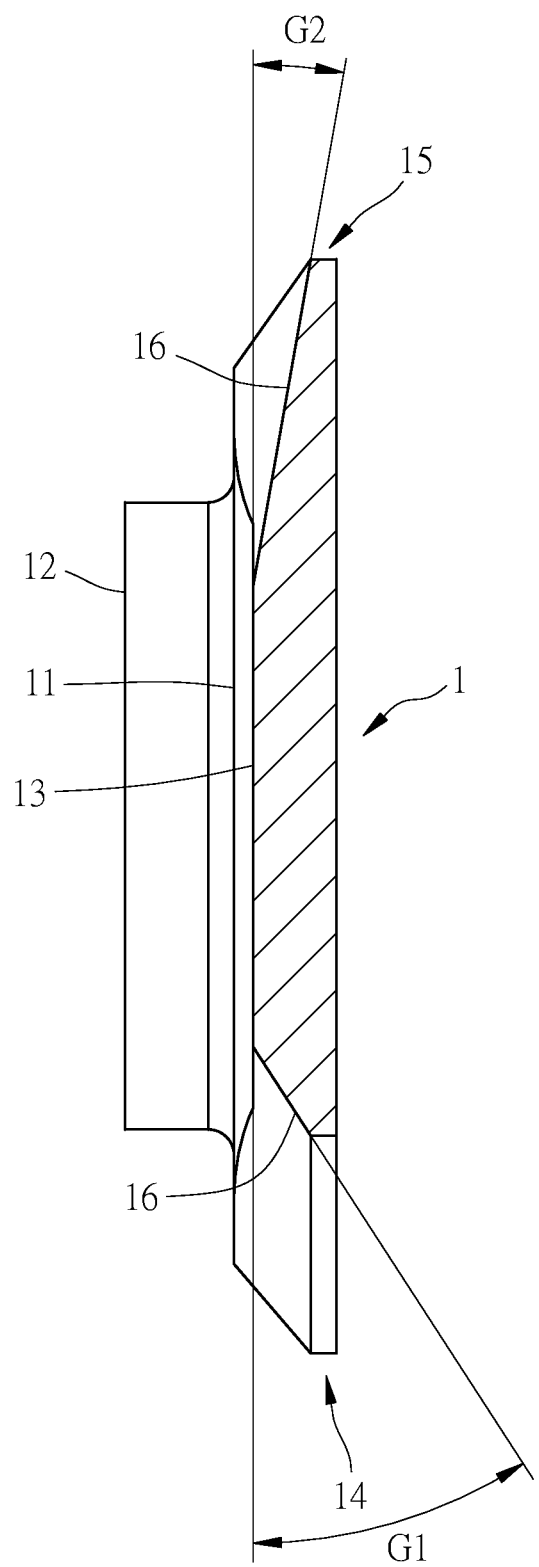
FIG. 4 is a cross-sectional view taken along line IV-IV of FIG. 2.

The inner plate body 1 includes two circular first coupling portions 11 at two ends thereof and a first waist portion 13 between the two first coupling portions 11. The first coupling portion 11 has a first axial hole 12 passing through the first coupling portion 11. The first waist portion 13 is in the form of a recess, so that the first waist portion 13 is lower in height than the two first coupling portions 11. Two sides of the first waist portion 13 are oppositely provided with a first receiving portion 14 on the inner side and a first outer side portion 15 on the outer side. The first receiving portion 14 is curved, and the first outer side portion 15 is straight. The first outer side portion 15 has a first slope 16 extending toward the outer side. The first slope 16 and the first waist portion 13 form a continuous two-step structure, as shown in FIG. 4. The first slope 16 surrounds the entire perimeter of the inner plate body 1. The first inclination angle G1 of the first slope 16 adjacent to the first receiving portion 14 relative to the first waist portion 13 is between 5 degrees and 85 degrees. The second inclination angle G2 of the first slope 16 adjacent to the first outer side portion 15 relative to the first waist portion 13 is between 5 degrees and 85 degrees.

Figure 5:
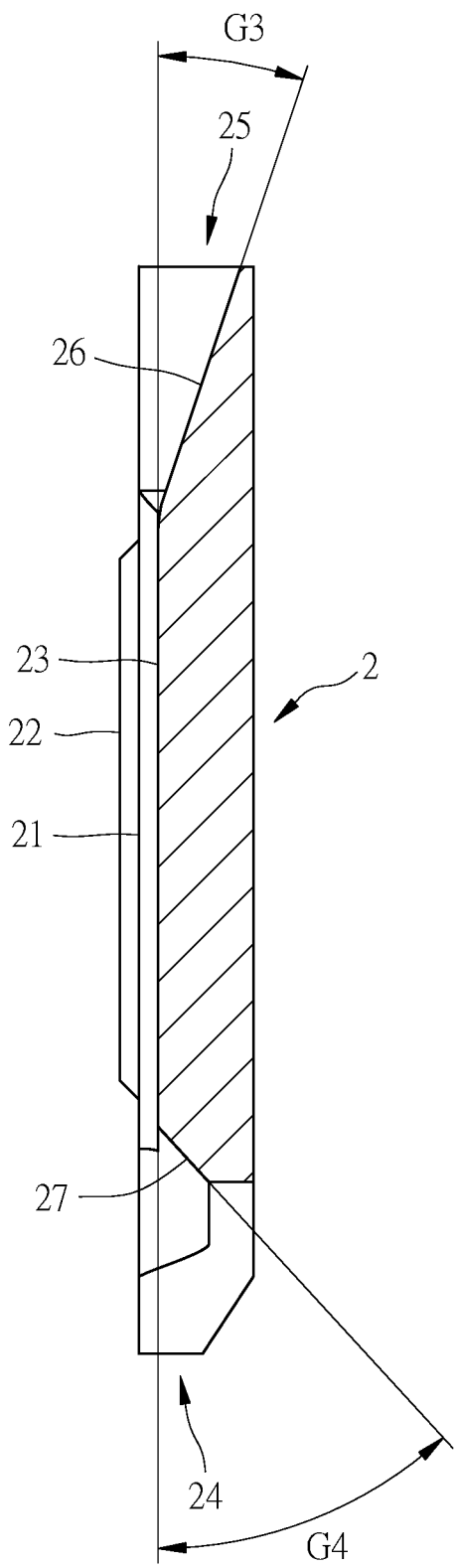
FIG. 5 is a cross-sectional view taken along line V-V of FIG. 3.

The outer plate body 2 includes two circular second coupling portions 21 at two ends thereof and a second waist portion 23 between the two second coupling portions 21. The second coupling portion 21 has a second axial hole 22 passing through the second coupling portion 21. The second waist portion 23 is in the form of a recess, so that the second waist portion 23 is lower in height than the two second coupling portions 21. Two sides of the second waist portion 23 are oppositely provided with a second receiving portion 24 on the inner side and a second outer side portion 25 on the outer side. The second receiving portion 24 is curved, and the second outer side portion 25 is straight. The second outer side portion 25 has a second slope 26 extending toward the outer side. The second slope 26 and the second waist portion 23 form a continuous two-step structure, as shown in FIG. 5. The third inclination angle G3 of the second slope 26 relative to the second waist portion 23 is between 5 degrees and 85 degrees. The second receiving portion 24 has a chamfer 27 extending toward the inner side. The fourth inclination angle G4 of the chamfer 27 relative to the second waist portion 23 is between 5 degrees and 85 degrees.

Figure 6:
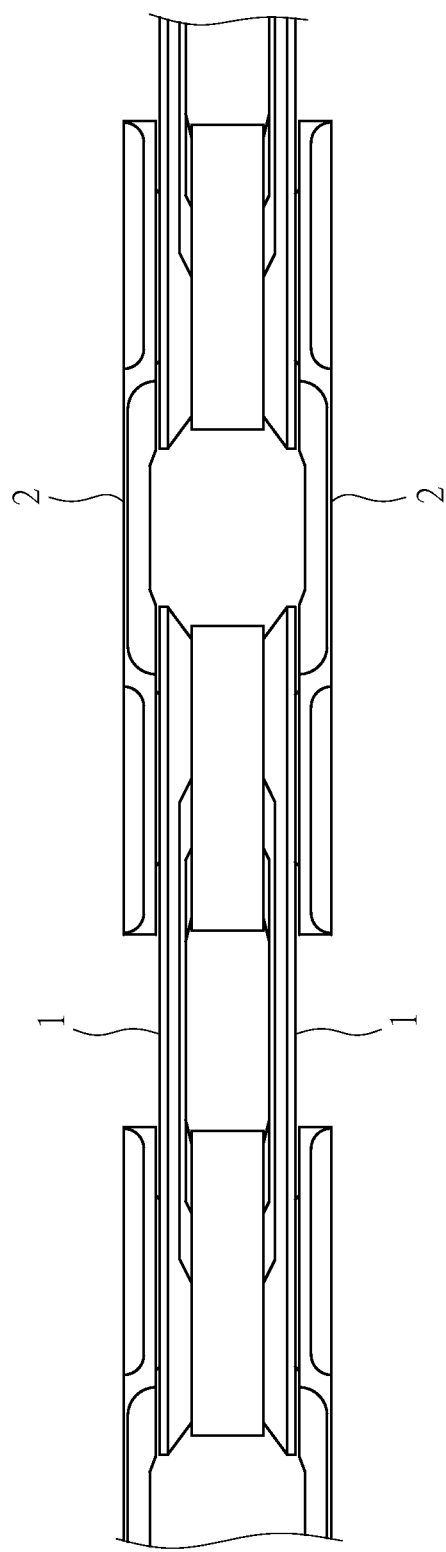
FIG. 6 is a cross-sectional view of the inner plate bodies and the outer plate bodies that are assembled into a chain according to the first embodiment of the present invention.
Figure 7:
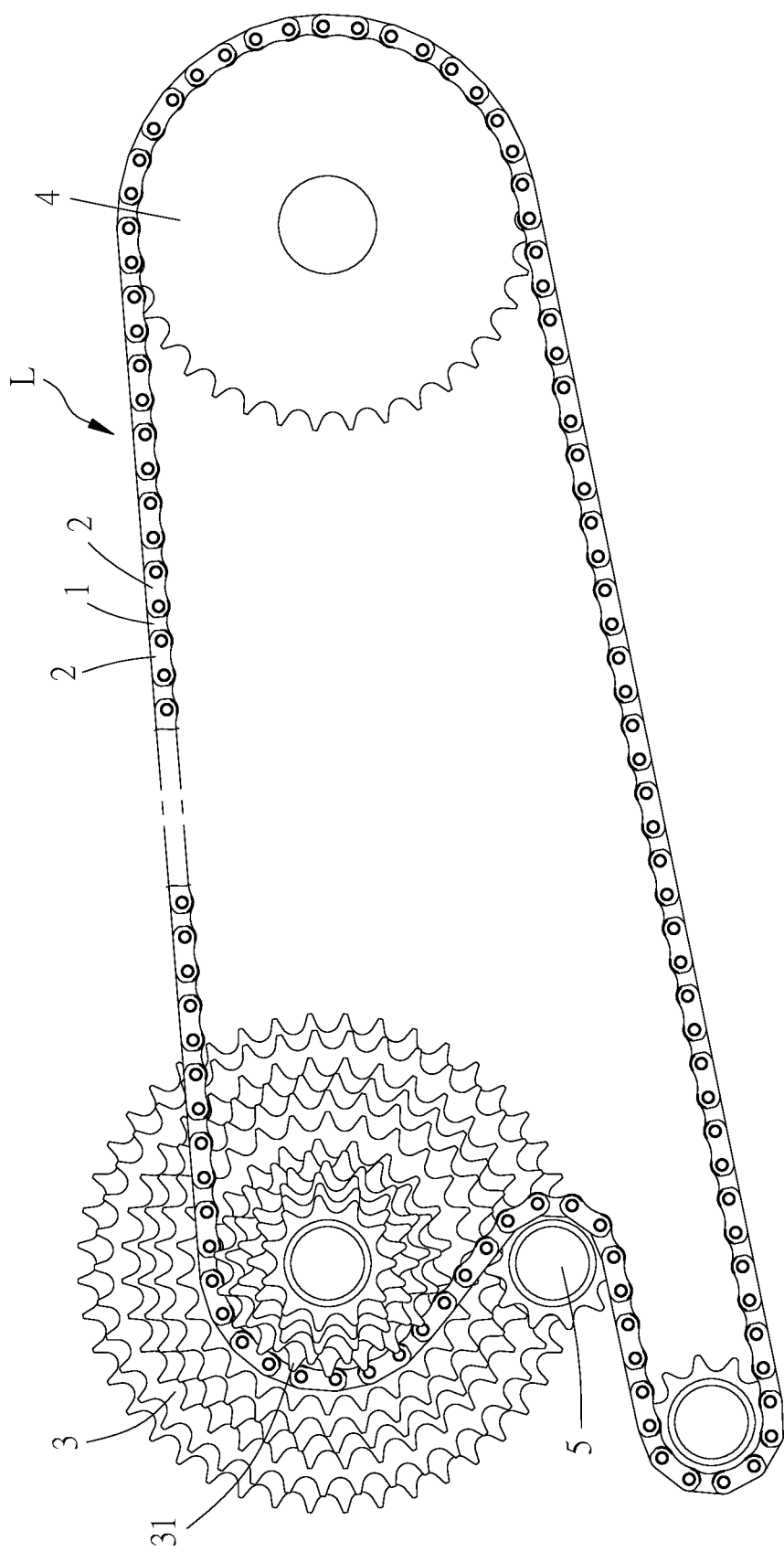
FIG. 7 is a schematic view of the use of the chain in cooperation with the speed change mechanism according to the first embodiment of the present invention.

When in use, as shown in FIG. 1, FIG. 6 and FIG. 7, two inner plate bodies 1 are pivotally connected to two outer plate bodies 2 to form a chain link. A plurality of chain links are assembled into a chain L used for meshing transmission and speed change between plural flywheels 3 (twelve-stage speed change) and a chainring 4 of a bicycle speed change mechanism. The sprocket 31 of the flywheel 3 is inserted in the first receiving portion 14 of the inner plate body 1 and the second receiving portion 24 of the outer plate body 2, so that the chain L can be rotated. With the arrangement of the continuous two-step structure formed by the first slope 16 and the first waist portion 13 as well as the arrangement of the continuous two-step structure formed by the second slope 26 and the second waist portion 23, when the chain L is applied to a multi-stage speed change mechanism (such as, twelve-stage speed change) of an electric bicycle or mountain-climbing vehicle, the overall width (5.2 mm) of the chain can be kept constant or reduced. The overall tensile strength, impact resistance and torsion resistance of the chain L can be improved to enhance the safety of the chain L, without changing the spacing (2.3 mm) between the two inner plate bodies 1 and the spacing (3.9 mm) between the two outer plate bodies 2.

Because the first waist portion 13 and the second waist portion 23 are in the form of a recess, the strength and impact resistance may be reduced. With the arrangement of the first outer side portion 15 that is located on the outer side of the inner plate body 1 and is straight, in cooperation with the first slope 16, as well as the arrangement of the second outer side portion 25 that is located on the outer side of the outer plate body 2 and is straight, in cooperation with the second slope 26, the areas of the first waist portion 13 and the second waist portion 23 increase, so as to increase the strength and impact resistance. Besides, because the first waist portion 13 of the inner plate body 1 is in the form of a recess and the second waist portion 23 of the outer plate body 2 is in the form of a recess, without changing the total width of the chain L, the spacing between the two inner plate bodies 1 and the spacing between the two outer plate bodies 2 increase, so that they all meet the chain standard. The curved first and second receiving portions 14, 24 and the straight first and second outer side portions 15, 25 of the first and second waist portions 13, 23 are configured to increase the strength, impact resistance and torsion resistance of the chain L. The chain L cooperates with a guide wheel 5 of the speed change mechanism to change speed, so that when the sprocket 31 is engaged with or disengaged from the chain, it can be positioned quickly, without making any noise.

The first slope 16 surrounds the entire perimeter of the inner plate body 1, in cooperation with the first waist portion 13 in the form of a recess, thereby increasing the spacing between the two inner plate bodies 1 to improve speed change. The chain L cooperates with the guide wheel 5 of the speed change mechanism to change speed, so that when the sprocket 31 is engaged with or disengaged from the chain, the chain can be positioned quickly and run without making any noise.

Figure 8:
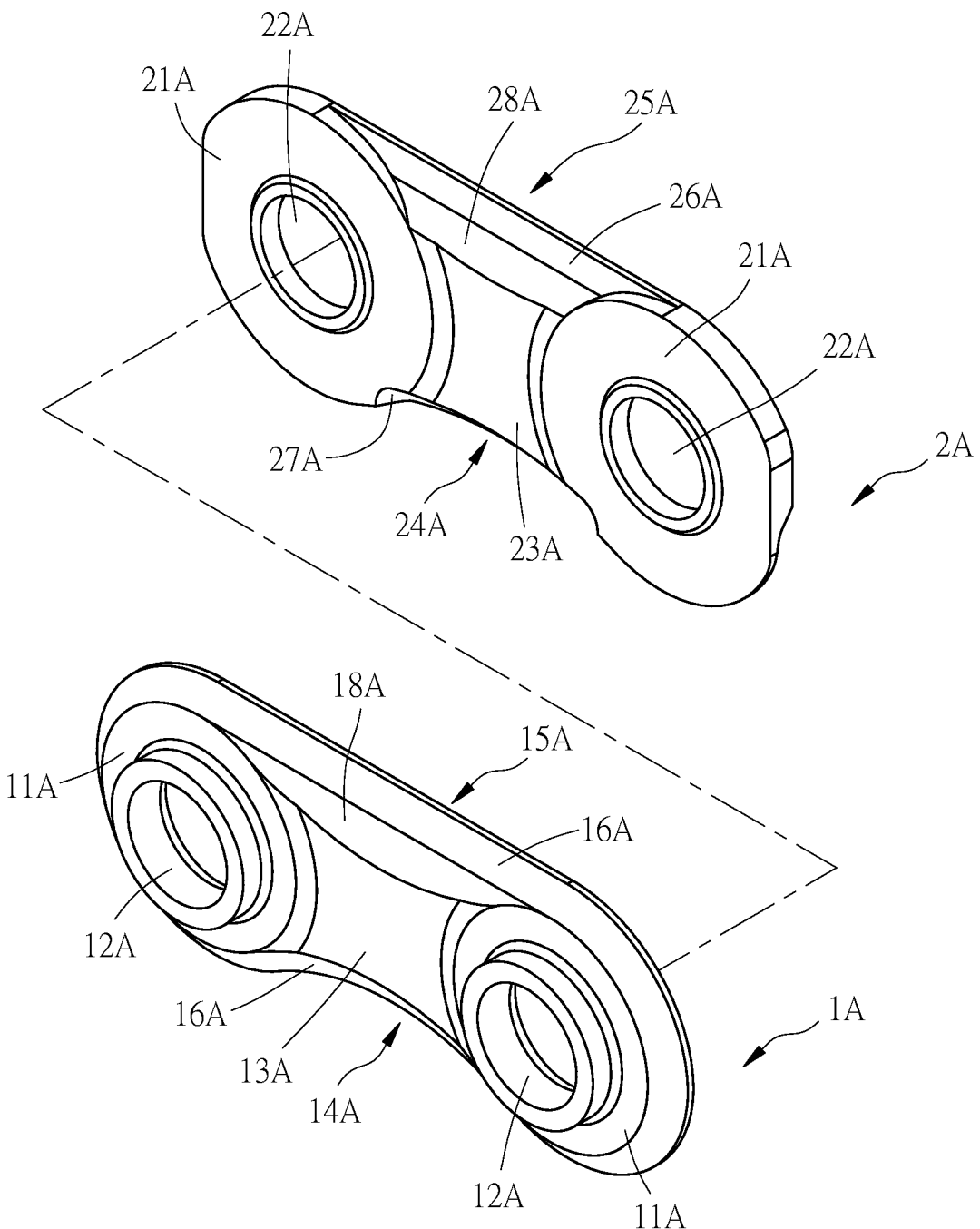
FIG. 8 is a perspective view according to a second embodiment of the present invention.
Figure 9:
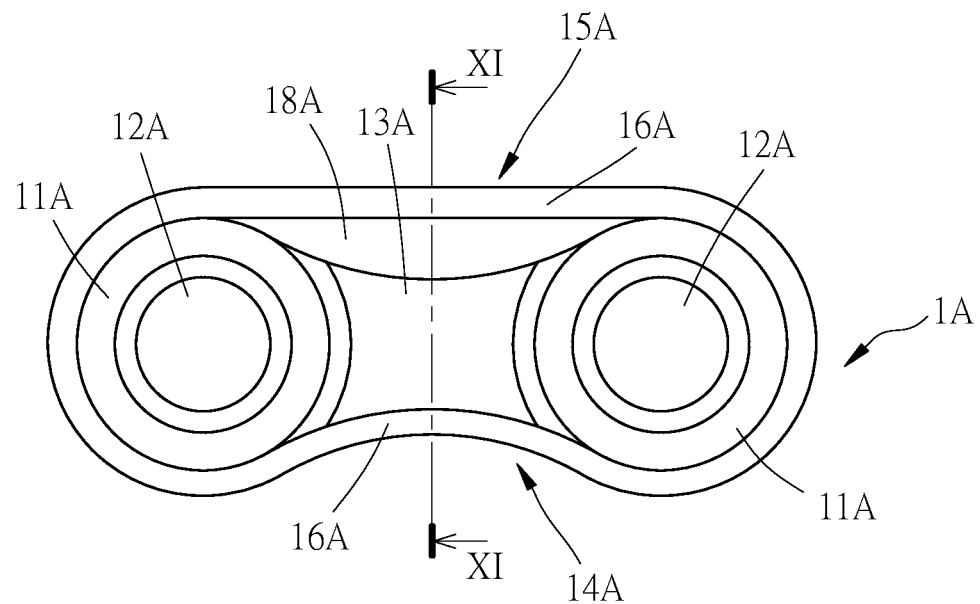
FIG. 9 is a front view of the inner plate body according to the second embodiment of the present invention.
Figure 10:
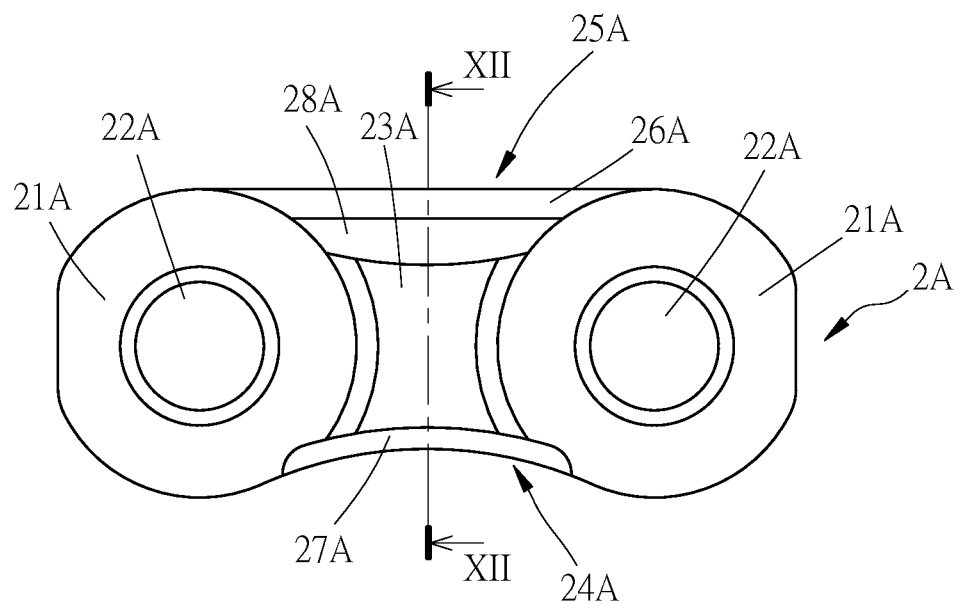
FIG. 10 is a front view of the outer plate body according to the second embodiment of the present invention.

As shown in FIG. 8, FIG. 9 and FIG. 10, the second embodiment of the present invention comprises an inner plate body 1A and an outer plate body 2A.

The inner plate body 1A includes two circular first coupling portions 11A at two ends thereof and a first waist portion 13A between the two first coupling portions 11A. The first coupling portion 11A has a first axial hole 12A passing through the first coupling portion 11A. The first waist portion 13A is in the form of a recess, so that the first waist portion 13A is lower in height than the two first coupling portions 11A. Two sides of the first waist portion 13A are oppositely provided with a first receiving portion 14A on the inner side and a first outer side portion 15A on the outer side. The first receiving portion 14A is curved, and the first outer side portion 15A is straight. The first outer side portion 15A has a first slope 16A extending toward the outer side. The first slope 16A and the first waist portion 13A form a continuous two-step structure, as shown in FIG. 11. The first slope 16A surrounds the entire perimeter of the inner plate body 1A. The first inclination angle G1 of the first slope 16A adjacent to the first receiving portion 14A relative to the first waist portion 13A is between 5 degrees and 85 degrees. The second inclination angle G2 of the first slope 16A adjacent to the first outer side portion 15A relative to the first waist portion 13A is between 5 degrees and 85 degrees. A third slope 18A extending toward the outer side is disposed between the first slope 16A adjacent to the first outer side portion 15A and the first waist portion 13A. The fifth inclination angle G5 of the third slope 18A relative to the first waist portion 13A is between 5 degrees and 85 degrees. The inclination angles of the first slope 16A and the third slope 18A are different. The first slope 16A, the third slope 18A and the first waist portion 13A form a continuous three-step structure.

The outer plate body 2A includes two circular second coupling portions 21A at two ends thereof and a second waist portion 23A between the two second coupling portions 21A. The second coupling portion 21A has a second axial hole 22A passing through the second coupling portion 21A. The second waist portion 23A is in the form of a recess, so that the second waist portion 23A is lower in height than the two second coupling portions 21A. Two sides of the second waist portion 23A are oppositely provided with a second receiving portion 24A on the inner side and a second outer side portion 25A on the outer side. The second receiving portion 24A is curved, and the second outer side portion 25A is straight. The second outer side portion 25A has a second slope 26A extending toward the outer side. The second slope 26A and the second waist portion 23A form a continuous two-step structure, as shown in FIG. 12. The third inclination angle G3 of the second slope 26A relative to the second waist portion 23A is between 5 degrees and 85 degrees. A fourth slope 28A extending toward the outer side is disposed between the second slope 26A and the second waist portion 23A. The sixth inclination angle G6 of the fourth slope 28A relative to the second waist portion 23A is between 5 degrees and 85 degrees. The inclination angles of the second slope 26A and the fourth slope 28A are different. The second slope 26A, the fourth slope 28A and the second waist portion 23A form a continuous three-step structure. The second receiving portion 24A has a chamfer 27A extending toward the inner side. The fourth inclination angle G4 of the chamfer 27A relative to the second waist portion 23A is between 5 degrees and 85 degrees. In this way, the safety of the chain can be improved.

Figure 13:
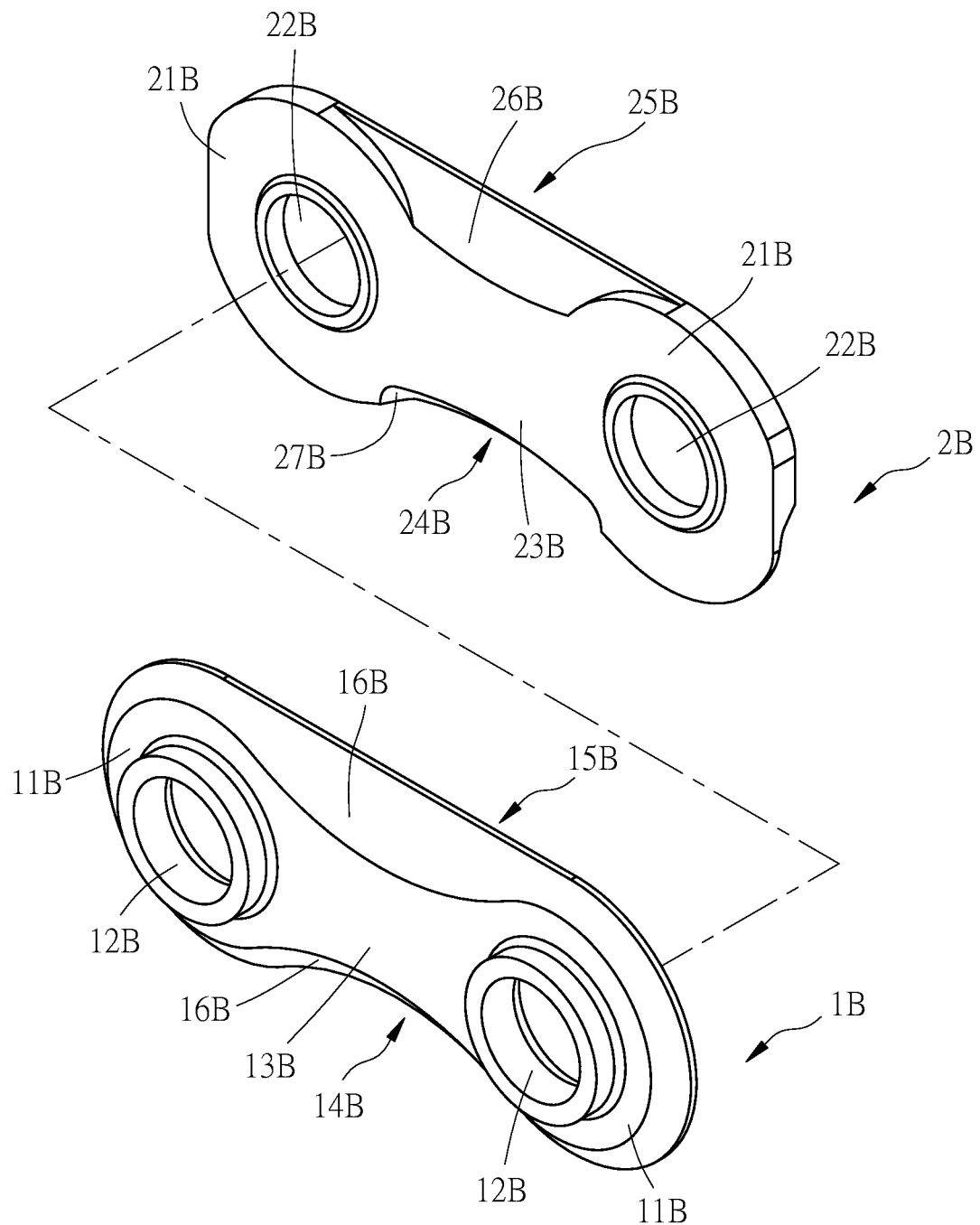
FIG. 13 is a perspective view according to a third embodiment of the present invention.
Figure 14:
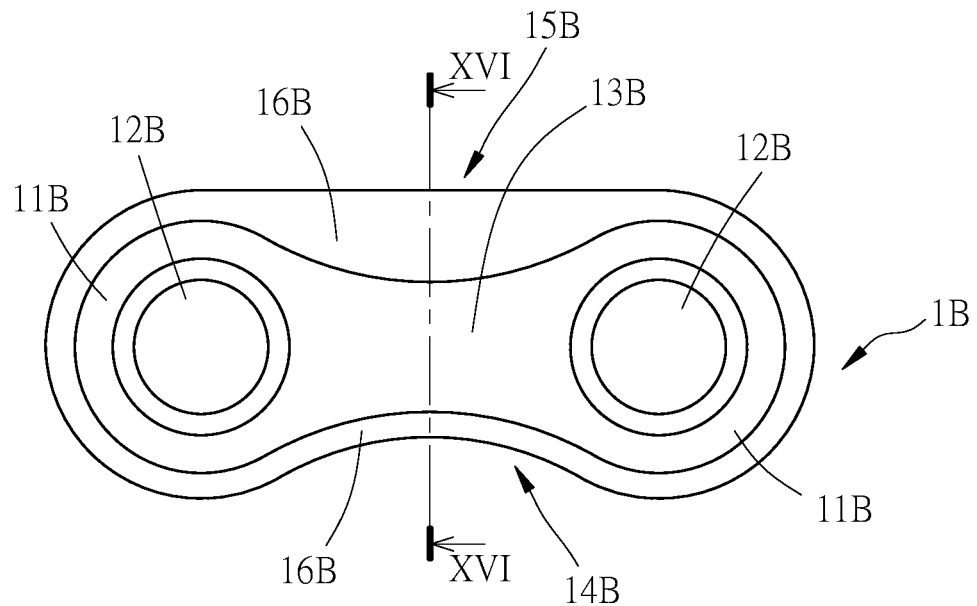
FIG. 14 is a front view of the inner plate body according to the third embodiment of the present invention.
Figure 15:
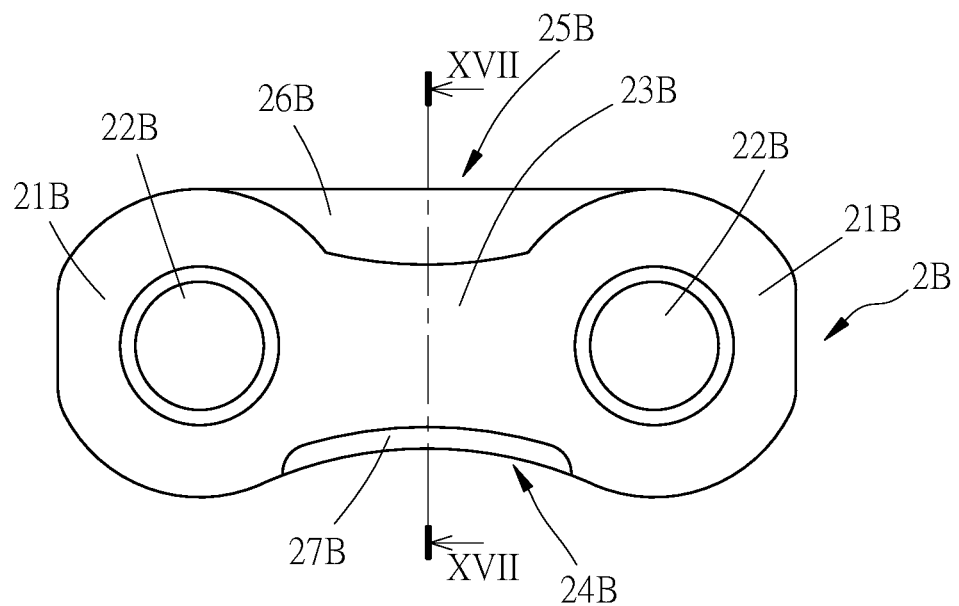
FIG. 15 is a front view of the outer plate body according to the third embodiment of the present invention.

As shown in FIG. 13, FIG. 14 and FIG. 15, the third embodiment of the present invention comprises an inner plate body 1B and an outer plate body 2B.

The inner plate body 1B includes two circular first coupling portions 11B at two ends thereof and a first waist portion 13B between the two first coupling portions 11B. The first coupling portion 11B has a first axial hole 12B passing through the first coupling portion 11B. The first waist portion 13B is higher in height than the two first coupling portions 11B. Two sides of the first waist portion 13B are oppositely provided with a first receiving portion 14B on the inner side and a first outer side portion 15B on the outer side. The first receiving portion 14B is curved, and the first outer side portion 15B is straight. The first outer side portion 15B has a first slope 16B extending toward the outer side. The first slope 16B and the first waist portion 13B form a continuous two-step structure, as shown in FIG. 16. The first slope 16B surrounds the entire perimeter of the inner plate body 1B. The first inclination angle G1 of the first slope 16B adjacent to the first receiving portion 14B relative to the first waist portion 13B is between 5 degrees and 85 degrees. The second inclination angle G2 of the first slope 16B adjacent to the first outer side portion 15B relative to the first waist portion 13B is between 5 degrees and 85 degrees.

The outer plate body 2B includes two circular second coupling portions 21B at two ends thereof and a second waist portion 23B between the two second coupling portions 21B. The second coupling portion 21B has a second axial hole 22B passing through the second coupling portion 21B. The second waist portion 23B is higher in height than the two second coupling portions 21B. Two sides of the second waist portion 23B are oppositely provided with a second receiving portion 24B on the inner side and a second outer side portion 25B on the outer side. The second receiving portion 24B is curved, and the second outer side portion 25B is straight. The second outer side portion 25B has a second slope 26B extending toward the outer side. The second slope 26B and the second waist portion 23B form a continuous two-step structure, as shown in FIG. 17. The third inclination angle G3 of the second slope 26B relative to the second waist portion 23B is between 5 degrees and 85 degrees. The second receiving portion 24B has a chamfer 27B extending toward the inner side. The fourth inclination angle G4 of the chamfer 27B relative to the second waist portion 23B is between 5 degrees and 85 degrees. In this way, the safety of the chain can be improved.

Figure 18:
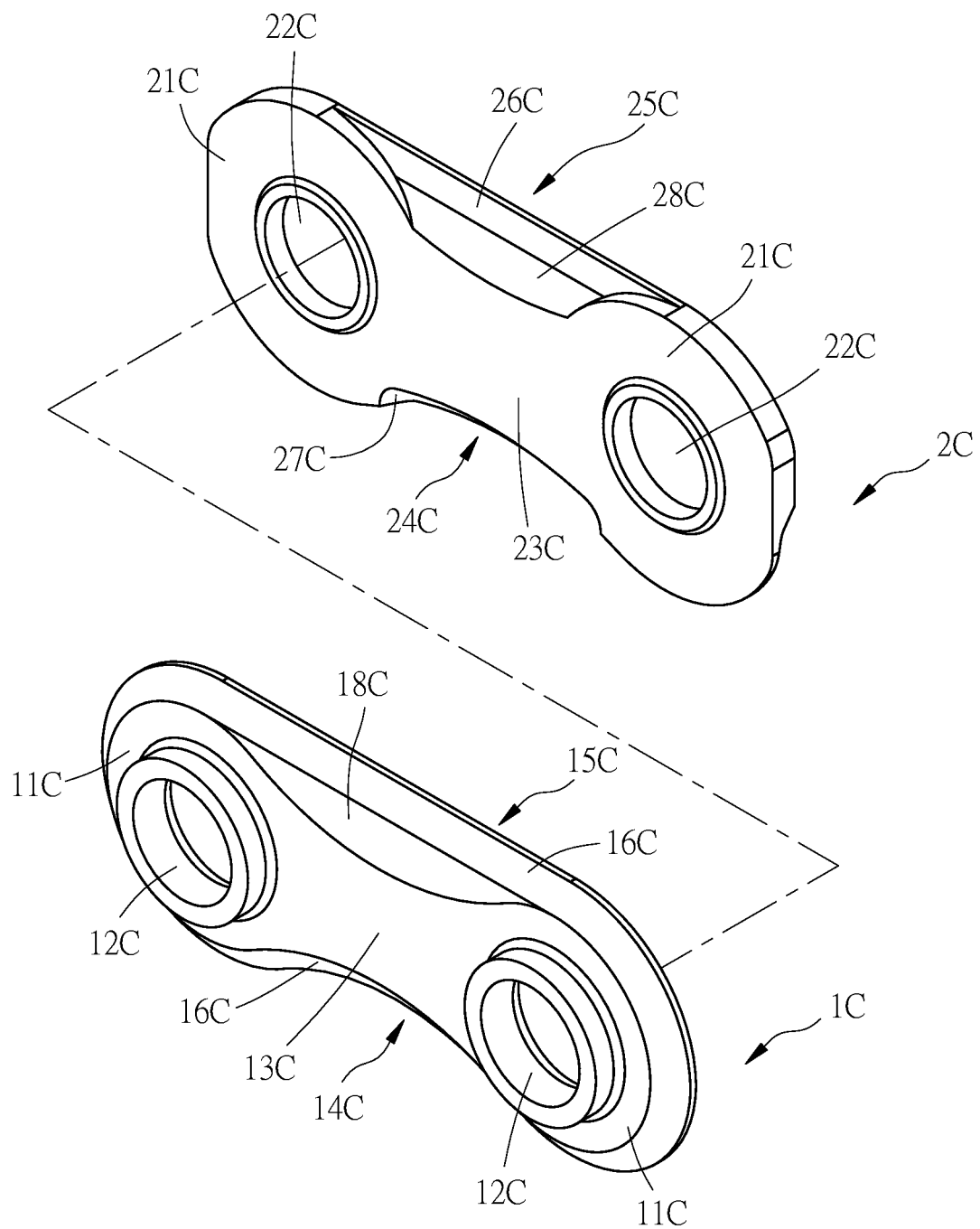
FIG. 18 is a perspective view according to a fourth embodiment of the present invention.
Figure 19:
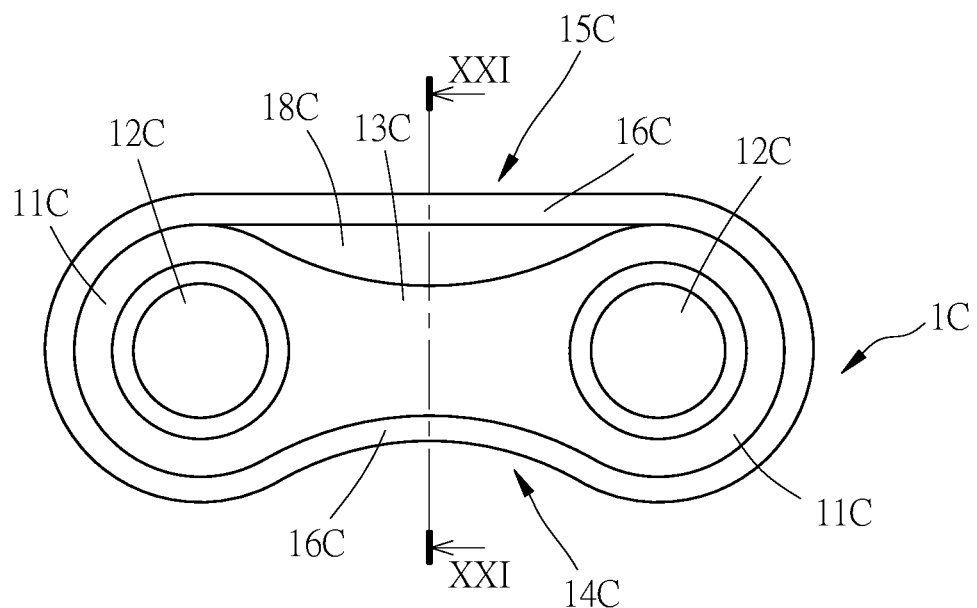
FIG. 19 is a front view of the inner plate body according to the fourth embodiment of the present invention.
Figure 20:
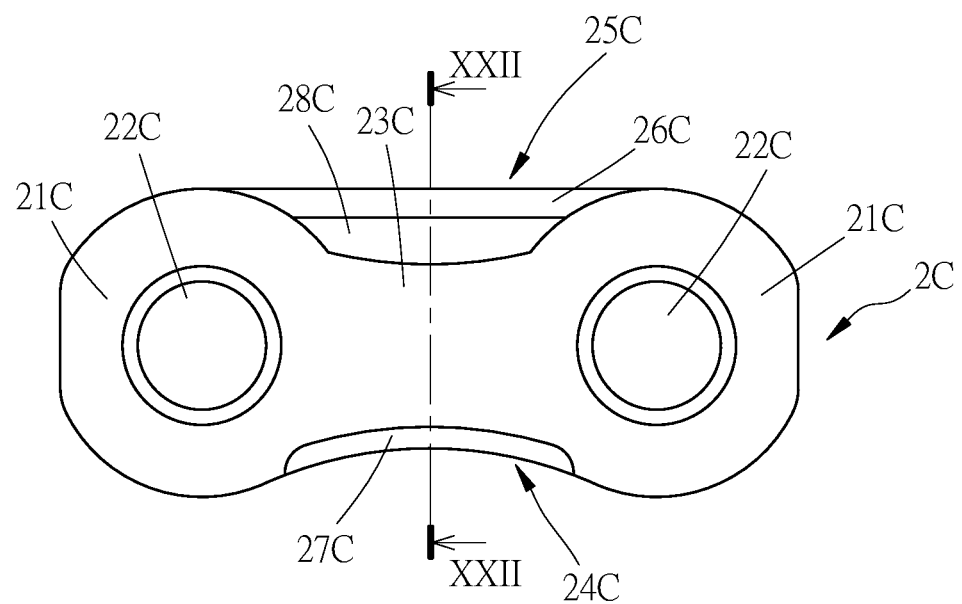
FIG. 20 is a front view of the outer plate body according to the fourth embodiment of the present invention.

As shown in FIG. 18, FIG. 19 and FIG. 20, the fourth embodiment of the present invention comprises an inner plate body 1C and an outer plate body 2C.

Figure 21:
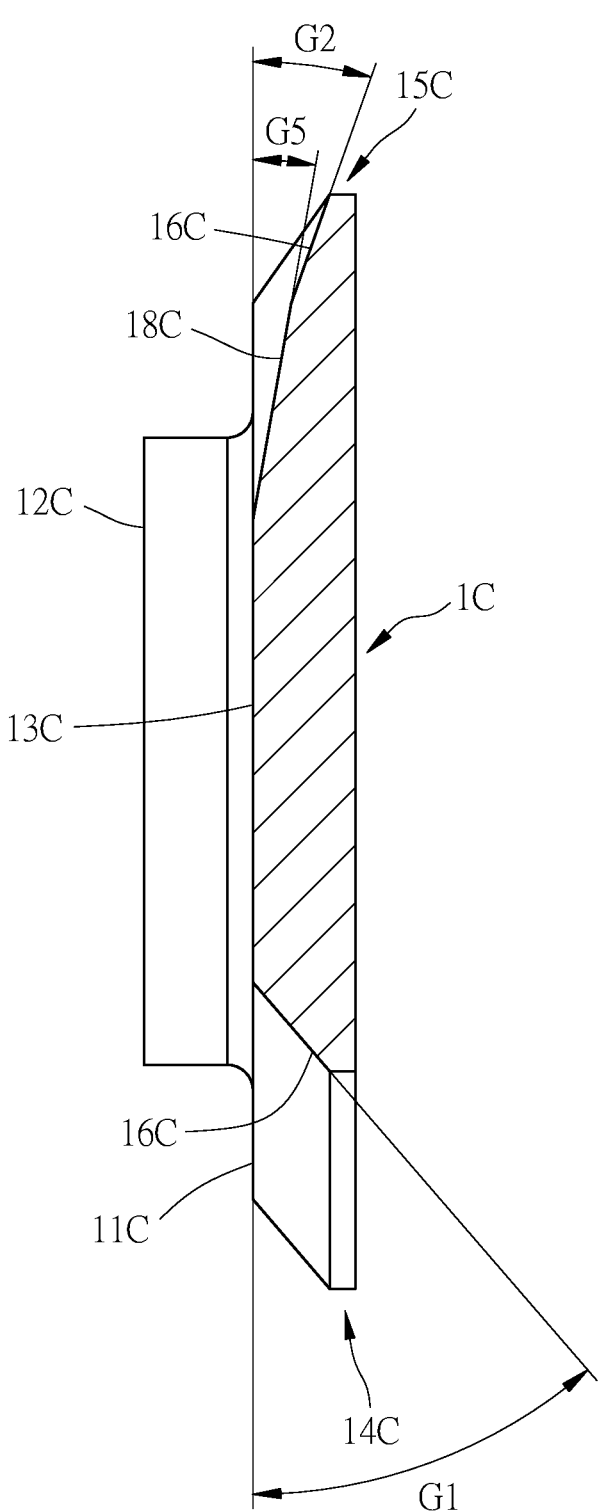
FIG. 21 is a cross-sectional view taken along line XXI-XXI of FIG. 19.

The inner plate body 1C includes two circular first coupling portions 11C at two ends thereof and a first waist portion 13C between the two first coupling portions 11C. The first coupling portion 11C has a first axial hole 12C passing through the first coupling portion 11C. The first waist portion 13C is higher in height than the two first coupling portions 11C. Two sides of the first waist portion 13C are oppositely provided with a first receiving portion 14C on the inner side and a first outer side portion 15C on the outer side. The first receiving portion 14C is curved, and the first outer side portion 15C is straight. The first outer side portion 15C has a first slope 16C extending toward the outer side. The first slope 16C and the first waist portion 13C form a continuous two-step structure, as shown in FIG. 21. The first slope 16C surrounds the entire perimeter of the inner plate body 1C. The first inclination angle G1 of the first slope 16C adjacent to the first receiving portion 14C relative to the first waist portion 13C is between 5 degrees and 85 degrees. The second inclination angle G2 of the first slope 16C adjacent to the first outer side portion 15C relative to the first waist portion 13C is between 5 degrees and 85 degrees. A third slope 18C extending toward the outer side is disposed between the first slope 16C adjacent to the first outer side portion 15C and the first waist portion 13C. The fifth inclination angle G5 of the third slope 18C relative to the first waist portion 13C is between 5 degrees and 85 degrees. The inclination angles of the first slope 16C and the third slope 18C are different. The first slope 16C, the third slope 18C and the first waist portion 13C form a continuous three-step structure.

Figure 22:
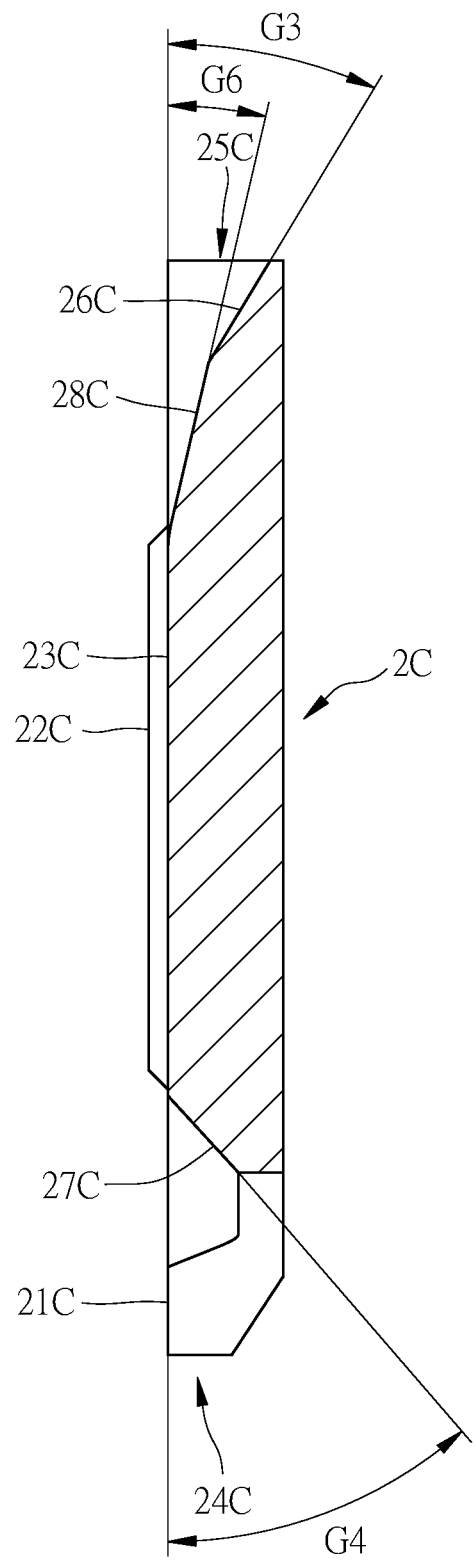
FIG. 22 is a cross-sectional view taken along line XXII-XXII of FIG. 20.

The outer plate body 2C includes two circular second coupling portions 21C at two ends thereof and a second waist portion 23C between the two second coupling portions 21C. The second coupling portion 21C has a second axial hole 22C passing through the second coupling portion 21C. The second waist portion 23C is higher in height than the two second coupling portions 21C. Two sides of the second waist portion 23C are oppositely provided with a second receiving portion 24C on the inner side and a second outer side portion 25C on the outer side. The second receiving portion 24C is curved, and the second outer side portion 25C is straight. The second outer side portion 25C has a second slope 26C extending toward the outer side. The second slope 26C and the second waist portion 23C form a continuous two-step structure, as shown in FIG. 22. The third inclination angle G3 of the second slope 26C relative to the second waist portion 23C is between 5 degrees and 85 degrees. A fourth slope 28C extending toward the outer side is disposed between the second slope 26C and the second waist portion 23C. The sixth inclination angle G6 of the fourth slope 28C relative to the second waist portion 23C is between 5 degrees and 85 degrees. The inclination angles of the second slope 26C and the fourth slope 28C are different. The second slope 26C, the fourth slope 28C and the second waist portion 23C form a continuous three-step structure. The second receiving portion 24C has a chamfer 27C extending toward the inner side. The fourth inclination angle G4 of the chamfer 27C relative to the second waist portion 23C is between 5 degrees and 85 degrees. In this way, the safety of the chain can be improved.

Although particular embodiments of the present invention have been described in detail for purposes of illustration, various modifications and enhancements may be made without departing from the spirit and scope of the present invention. Accordingly, the present invention is not to be limited except as by the appended claims.

What is claimed is:

1. A high-strength chain plate structure, comprising:
   an inner plate body, including two first coupling portions at two ends thereof and a first waist portion between the two first coupling portions, the first coupling portion having a first axial hole passing through the first coupling portion, two sides of the first waist portion being oppositely provided with a first receiving portion and a first outer side portion, the first receiving portion being curved, the first outer side portion being straight, the first outer side portion having a first slope, the first slope surrounding a perimeter of the inner plate body, the first slope and the first waist portion forming a continuous two-step structure;
   an outer plate body, including two second coupling portions at two ends thereof and a second waist portion between the two second coupling portions, the second coupling portion having a second axial hole passing through the second coupling portion, two sides of the second waist portion being oppositely provided with a second receiving portion and a second outer side portion, the second receiving portion being curved, the second outer side portion being straight, the second outer side portion having a second slope, the second slope and the second waist portion forming a continuous two-step structure.

2. The high-strength chain plate structure as claimed in claim 1, wherein a first inclination angle of the first slope adjacent to the first receiving portion relative to the first waist portion is between 5 degrees and 85 degrees, and a second inclination angle of the first slope adjacent to the first outer side portion relative to the first waist portion is between 5 degrees and 85 degrees.

3. The high-strength chain plate structure as claimed in claim 1, wherein a third inclination angle of the second slope relative to the second waist portion is between 5 degrees and 85 degrees.

4. The high-strength chain plate structure as claimed in claim 1, wherein the inner plate body and the outer plate body each have two sides, one side where the inner plate body and the outer plate body engage with a sprocket of a flywheel is defined as an inner side, the other side that does not engage with the sprocket is defined as an outer side, the first receiving portion is located on the inner side, the first outer side portion is located on the outer side, the second receiving portion is located on the inner side, and the second outer side portion is located on the outer side.

5. The high-strength chain plate structure as claimed in claim 4, wherein the second receiving portion has a chamfer extending toward the inner side.

6. The high-strength chain plate structure as claimed in claim 5, wherein a fourth inclination angle of the chamfer relative to the second waist portion is between 5 degrees and 85 degrees.

7. The high-strength chain plate structure as claimed in claim 1, wherein a third slope is disposed between the first slope adjacent to the first outer side portion and the first waist portion, inclination angles of the first slope and the third slope are different, the first slope, the third slope and the first waist portion form a continuous three-step structure, a fourth slope is disposed between the second slope and the second waist portion, inclination angles of the second slope and the fourth slope are different, and the second slope, the fourth slope and the second waist portion form a continuous three-step structure.

8. The high-strength chain plate structure as claimed in claim 7, wherein a fifth inclination angle of the third slope relative to the first waist portion is between 5 degrees and 85 degrees, and a sixth inclination angle of the fourth slope relative to the second waist portion is between 5 degrees and 85 degrees.

9. The high-strength chain plate structure as claimed in claim 1, wherein the first waist portion is in the form of a recess so that the first waist portion is lower in height than the two first coupling portions, and the second waist portion is in the form of a recess so that the second waist portion is lower in height than the two second coupling portions.

10. The high-strength chain plate structure as claimed in claim 1, wherein the first waist portion is higher in height than the two first coupling portions, and the second waist portion is higher in height than the two second coupling portions.

* * * * *